G. M. EATON.
RESILIENT DRIVING CONNECTION.
APPLICATION FILED MAY 27, 1912.
1,130,264.
Patented Mar. 2, 1915.
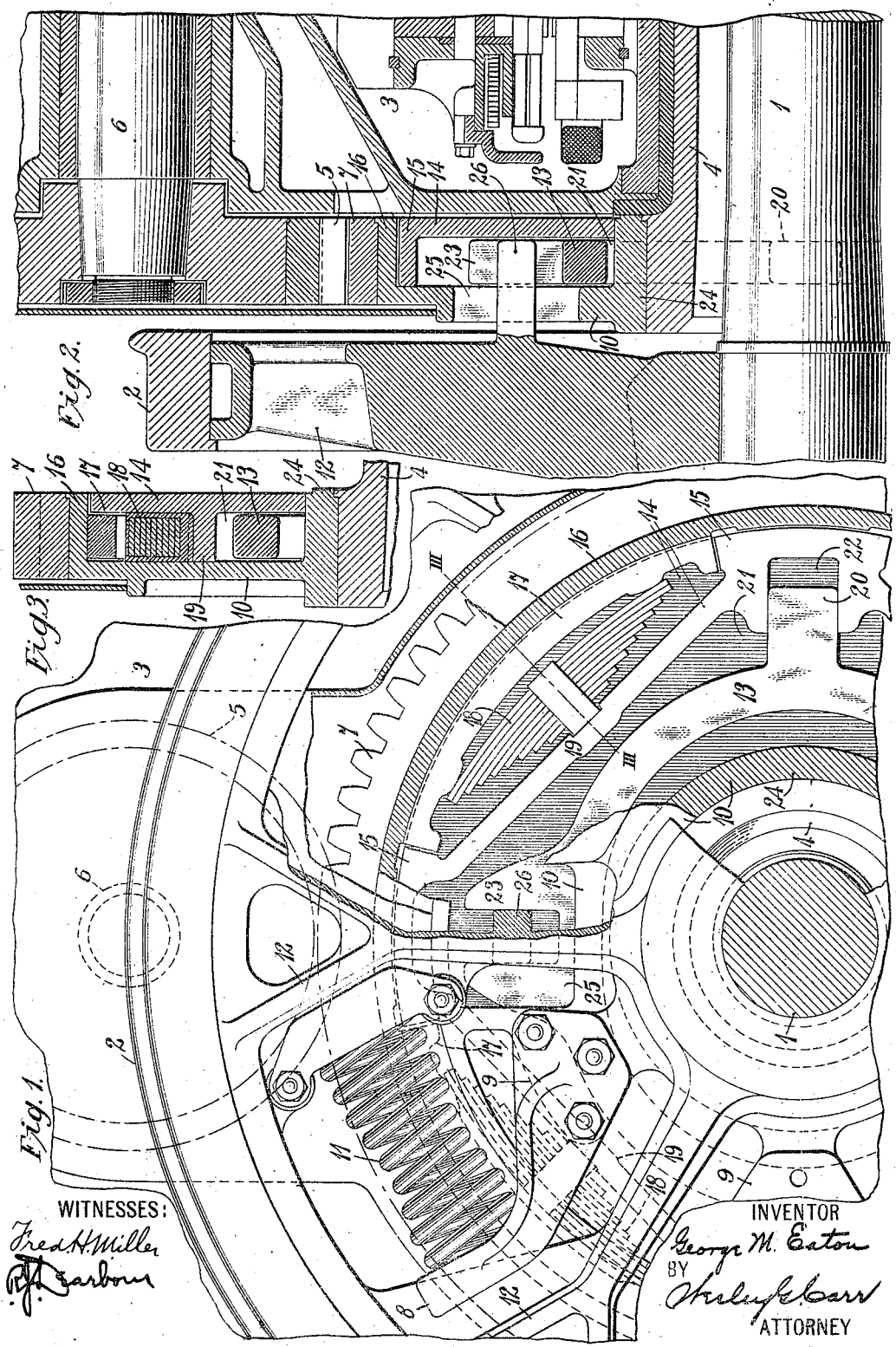

UNITED STATES PATENT OFFICE.

GEORGE M. EATON, OF WILKINSBURG, PENNSYLVANIA, ASSIGNOR TO WESTINGHOUSE ELECTRIC AND MANUFACTURING COMPANY, A CORPORATION OF PENNSYLVANIA.

RESILIENT DRIVING CONNECTION.

1,130,264.      Specification of Letters Patent.      Patented Mar. 2, 1915.

Application filed May 27, 1912. Serial No. 700,037.

*To all whom it may concern:*

Be it known that I, GEORGE M. EATON, a citizen of the United States, and a resident of Wilkinsburg, in the county of Allegheny and State of Pennsylvania, have invented a new and useful Improvement in Resilient Driving Connections, of which the following is a specification.

My invention relates to locomotives and other self-propelled railway vehicles and it has special reference to the driving connections between the motors and the driving wheels of electric locomotives.

The object of my invention is to provide a relatively simple, yielding, driving connection of the class above indicated that shall embody means for absorbing the shocks and thereby reducing the strains to which the connected parts are subjected.

Resilient driving connections embodying some shock-absorbing means have been devised heretofore and, according to my present invention, I provide a connection of the same general character as that set forth in Patent 1,070,564, granted August 19, 1913, to John E. Webster, and assigned to the Westinghouse Electric & Manufacturing Company.

The preferred embodiment of my present invention comprises a driven shaft or axle and a driving gear wheel, having two friction clutch-connected parts, one of which is yieldingly connected to the driven axle and the other of which is operatively connected to the axle by a non-yielding connection.

Figure 1 of the accompanying drawings is a partially sectional elevation of a portion of a driving connection embodying my invention. Fig. 2 is a sectional elevation at right angles to Fig. 1, and Fig. 3 is a sectional view on the line III—III of Fig. 1.

Referring to the drawings, the structure here shown comprises a driving axle 1 which is equipped with the usual driving wheels 2 (only one of which is shown), an electric driving motor 3, a quill or sleeve 4 surrounding the axle 1 and a driving connection between the motor and the driving wheels.

The driving connection comprises a pinion 5, secured to the end of the motor shaft 6, a gear wheel 7 which is composed of two clutch-connected parts, radial arms 8 which are secured to projections 9 of a gear wheel body 10 and springs 11 which are interposed between spokes 12 of the driving wheel and the radial arms 8.

In addition to the body 10, the gear wheel 7 comprises a ring 13, friction shoes 17, springs 18, and an annular member 14 having a plurality of projections 15 which constitute small segments of a cylindrical surface and are fitted into a flange 16 of the body 10. The shoes 17, which are ring segments, are located between the projections 15 of the member 14 and are pressed into engagement with the flange 16 by means of semi-elliptical springs 18. These springs are interposed between the shoes 17 and ribs 19 which form a part of the member 14 and join the projections 15.

The ring 13 is located in an annular pocket 21, formed between the body 10 and the member 14 within the ribs 19 and is provided with a pair of opposite lugs 20 which extend into notches 22 in the projections 15. The ring 13 is also provided with a pair of bifurcated projections 23 which are located oppositely and in quadrature relation to the lugs 20.

The body 10 is composed of a hub 24 which is secured to the end of the quill 4, and an annular portion having the projections 9 and the flange 16. The annular portion of the body 10 is provided with openings 25 which are opposite the bifurcated projections 23 of the ring 13.

The spokes 12 of the wheel 2 which are opposite the holes 25 in the body 10 are provided with lateral projections 26 which extend through the holes 25 and are engaged by the arms of the bifurcated projections 23.

The ring 13 is free to move in the direction of the diameter through the projections 23, since the notches which bifurcate these projections are radial and are made sufficiently deep with this in view. The ring 13, together with the wheel 2 can move at right angles to the line of adjustment of the ring relative to the wheel, with respect to the remainder of the gear, by reason of the fact that the notches 22 in the member 14 are radial and the lugs 20 do not extend to the bottom of the notches. It thus appears that the part 14 is positively driven by the projections 26 of the wheel but freedom of radial movement between the connected parts is permitted. The part 14 is, however, only connected to the rim of the gear wheel 7, and the body 10 by a friction clutch composed of the shoes 17 and the springs 18.

In addition to the driving connection just described, the body 10, as above indicated, is provided with arms 8 which are connected to the wheel spokes 12 by tangential springs 11. Since the body 10 is rigidly secured to the rim of the gear wheel 7, the primary driving connection is established from the gear wheel to the driving wheel through the springs 11, but, by reason of the friction clutch connection, the springs are relieved from shocks and vibrations to which they might otherwise be subjected.

When electric locomotives and other vehicles are started under adverse conditions, or when the brakes are suddenly applied to the driving wheels, a vibration of the spring-connected parts is quite likely to result. Furthermore, driving connections of this general class show a tendency to vibrate or oscillate with increasing amplitude in case the driving wheels slip, causing the springs to be compressed or materially extended, and a heavy blow to be delivered to the wheel spokes by the radial driving arms.

The friction clutch-connection of my invention constitutes an effective means of damping out or preventing the vibration above referred to and materially improves the character and operation of the driving connection.

The springs 18 are sufficiently strong to introduce a large factor of frictional resistance to any rotative adjustment between the ring 13 and the member 14, and the rim of the gear wheel.

Structural modifications may, of course, be effected within the spirit and scope of my invention.

I claim as my invention:

1. A driving connection comprising a driving member, a driven member yieldingly connected thereto and shock-absorbing means comprising a friction clutch driving connection interposed between the yieldingly connected parts.

2. A driving connection for railway vehicles comprising a driving motor, a wheel axle, a yielding connection between the motor and axle and a friction clutch-connection between the said parts in multiple relation to the yielding connection.

3. A driving connection for railway vehicles comprising a driving motor, a wheel axle, a yielding connection between the motor and axle and a friction clutch-connection between the said parts in multiple relation to the yielding connection and comprising a plurality of radial shoes, elliptical springs and a universal joint connection.

4. A driving connection for railway vehicles comprising a driving motor, a wheel axle, a quill loosely surrounding the axle, a gear wheel structure secured to one end of the quill and operatively connected to the motor shaft, a plurality of tangential springs interposed between the wheel spokes and a portion of the gear wheel structure and a direct connection between the wheel spokes and the gear wheel structure including a friction clutch.

5. A driving connection for railway vehicles comprising a driving motor, a wheel axle, a quill loosely surrounding the axle, a gear wheel structure secured to one end of the quill and operatively connected to the motor shaft, a plurality of tangential springs interposed between the wheel spokes and a portion of the gear wheel structure and a direct connection between the wheel spokes and the gear wheel structure including a friction clutch comprising a floating member within the gear wheel structure, a plurality of friction shoes, springs interposed between the floating members and the shoes and forcing the latter into engagement with the gear wheel and a universal joint connection between the floating member and the wheel spokes.

In testimony whereof, I have hereunto subscribed my name this 11th day of May, 1912.

GEORGE M. EATON.

Witnesses:
B. B. HINES,
M. C. MERZ.